United States Patent [19]

Lauenroth et al.

[11] 4,127,779

[45] Nov. 28, 1978

[54] DEVICE FOR PHOTOGRAMMETRIC EVALUATION OF STEREO-COUPLES OF PHOTOGRAPHS

[75] Inventors: Gerhard Lauenroth; Lutz Papenkordt, both of Jena-Lobeda, German Democratic Rep.

[73] Assignee: Jenoptik Jena G.m.b.H., Jena, German Democratic Rep.

[21] Appl. No.: 797,658

[22] Filed: Jun. 17, 1977

[30] Foreign Application Priority Data

Jul. 23, 1976 [DD] German Democratic Rep. ... 194023

[51] Int. Cl.² .............................................. G01C 11/12
[52] U.S. Cl. ........................................ 250/558; 356/2
[58] Field of Search ........................... 356/2, 203, 205; 250/558, 208, 209

[56] References Cited

U.S. PATENT DOCUMENTS

| 3,726,591 | 4/1973 | Helava et al. ............................ 356/2 |
| 3,811,011 | 5/1974 | Hardy et al. ........................ 250/558 |

*Primary Examiner*—David C. Nelms

[57] ABSTRACT

A device for photogrammetric evaluation of stereo-couples of photographs which are scanned light electrically and, in order to obtain height coordinate values, are evaluated by correlation.

The device is particularly useful in the evaluation of aerial photographs. To reduce correlation errors due to interfering signals obtained from different correlator signal channels and, hence, to increase the precision of a correlation operation, at one time only the informations from one correlator signal channel in each of the two scanning channels are exploited to obtain the informations from the scanned stereo-pair of photographs.

Therefore, it is desireable that, in the course of the correlation operation, the highly resolving correlator signal channels are predominantly and for a considerable long time employed to correlate the informations. According to the invention gate circuits are inserted between the correlator signal channels and the discriminator.

The signal channels are successively triggered via the gates by operation of a pulse distributer connected to a clock pulse generator in a sequence of the rising resolution of said channels.

1 Claim, 1 Drawing Figure

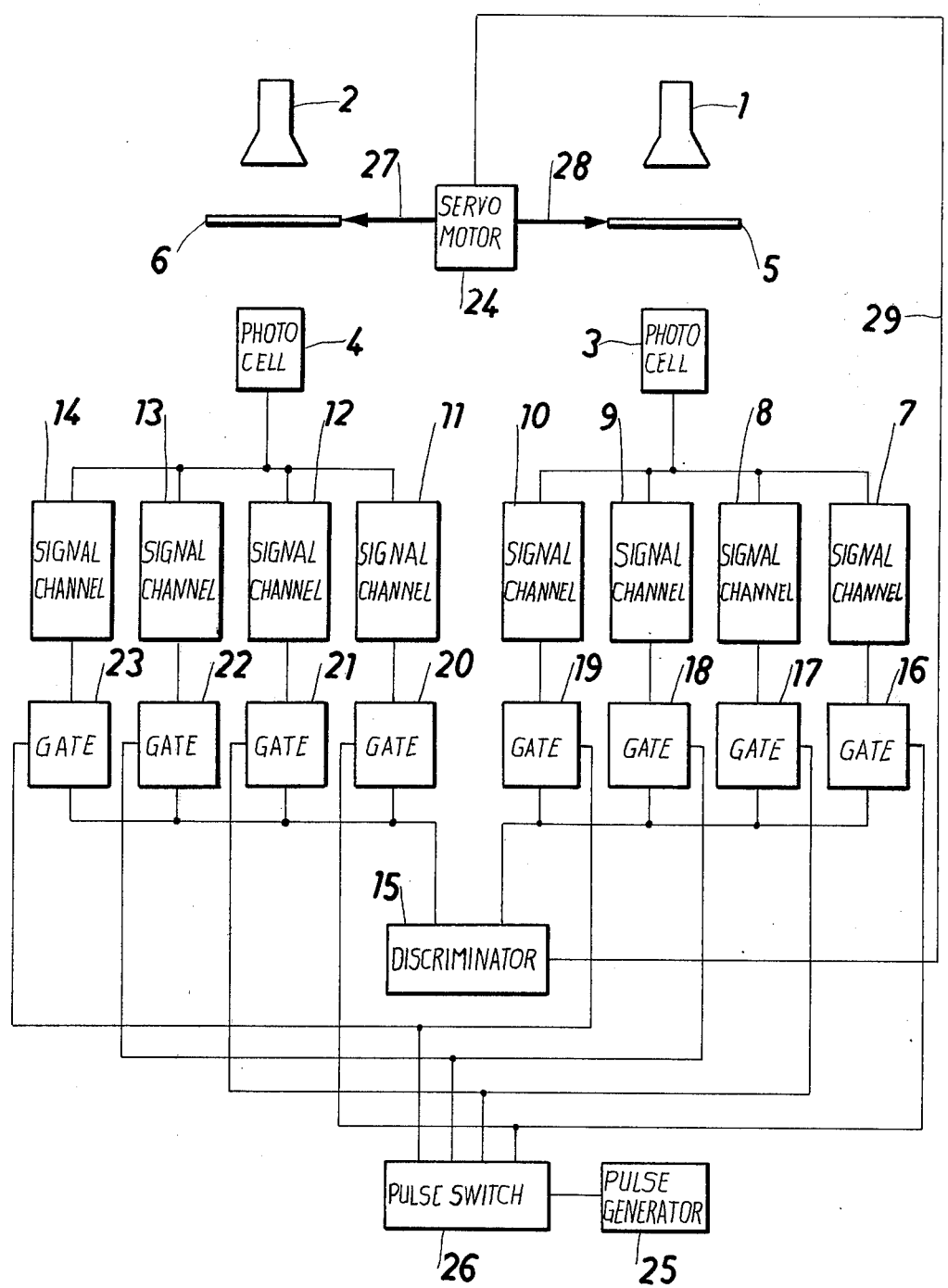

DEVICE FOR PHOTOGRAMMETRIC EVALUATION OF STEREO-COUPLES OF PHOTOGRAPHS

This invention concerns a device for photogrammetric evaluation of stereo-couples of photographs comprising a correlator constituted of a number of signal channels of different resolution, a discriminator connected via gates to the respective channel outputs, and at least one displacement means which, in dependence on respective correlator signals displaces at least one of said photographs.

Previous stereo evaluation devices scan a stereo-couple of photographs by means of a flying spot raster. The photographs modulate the passing electron beam which produces respective electric pulses. The latter are fed into a correlator to produce a parallax error signal.

It is further known to employ a correlator with a plurality of signal processing channels which, in order to fan up the resolution, cover different frequency ranges and possess different delay times.

Said correlator is employed for a continuous parallel operation.

In this manner those signals are evaluated which are optimal with respect to signal density and correlation quality of scanned terrain surface photographs.

Since, however, the other channels also provide signals, interfering signals result particularly from the most or least resolving channels, depending on the details in the photographs taken from a terrain profile.

In their work "An electronic correlator for the Planimat", presented at the International Congress of Photogrammetry, Lausanne; Hardy, Johnston and Godfrey pointed out that it is not advantageous to employ correlator channels in continuous parallel operation, but rather to switch-in the higher resolving channels.

Such a mode of operation ensures that the channel of the lowest resolution is operative without interfering signals from any other channel.

When, however, the channels of high resolution are in operation interfering signals supplied from the least resolving channel are not definitely eliminated. It is an object of the present invention to obviate the above disadvantages.

It is a further object of the present invention substantially to eliminate interfering signals occuring in the course of correlating signals obtained from the scanning of stereo photographs, and to increase the accuracy of the correlation operation.

It is still a further object of the present invention to provide an evaluation device in which only one correlation channel is operative correlating the scanning signals obtained from each stereophoto scanning channel.

Said one correlation signal channel of the correlator, operative for a longest possible photo scanning time, has the highest possible resolution.

These and other objects are realised by a device for photogrammetric evaluation of stereophoto couples taken from a terrain surface of the like, comprising a correlator, constituted of a plurality of signal channels of different resolutions and different delay times, a discriminator connected via gates to the signal channel outputs and a displacement member, which follows the discriminator for displacing at least one of the scanned stereo-couples of photographs.

According to the invention a control unit in combination with a pulse generator is connected to the clock-pulse inputs of the gates.

The control unit opens the gates one after another according to the rising resolution of the respective signal channels. Thus, it is ensured that only the informations from one signal channel per stereo-photograph scanning channel are employed in the correlation operation.

The gates disconnect the remaining signal channels from the discriminator inputs and thus are inhibited to feed-in interfering signals.

A preselected time schedule serves to switch successively and individually the signal channels in dependence on their respective resolution.

Since it is desireable that the highest resolving signal channel delivers its signals for the correlation operation for a considerably long time, means are provided to keep the switching time from one signal channel to the next very short.

The individual signal channels are, similar to a shift register, repititively switched in the direction of increasing resolution.

Thus when at the switch-in moment the signal channel of the widest capture range, that is, of the lowest resolution, is operative, the correlation of the high resolving channel is lost, that is, does not lie within the respective frequency range, but due to the repititive shift register operation the correlation is regained.

Since the signal channels of a wide capture range, that is, of low resolution, are rapidly switched from one to the next the quality of the correlation is regained by the comparatively longer periods the high resolving signal channels are operative.

In order that the invention may be more readily understood reference is made to the accompanying drawing which illustrates diagrammatically and by way of example one embodiment thereof and in which The FIGURE is a schematical view of the principle underlying the invention.

Two cathode ray tubes 1, 2 emit each a path of rays (not shown) which are detected by photocells 3 and 4, respectively. Two photographs 5, 6 of a stereo-couple to be scanned are inserted into the respective paths of rays. The outputs of the photocell 3 are connected to signal channels 7, 8, 9, 10 and the outputs of the photocell 4 to respective channels 11, 12, 13, 14.

The cathode ray tube 2, the photocell 3 and the respective signals channels form a first scanning channel for scanning the photograph 5, whereas a second scanning channel is formed by the corresponding components mentioned hereinabove to scan the photograph 6 of the stereo-couple. The signal channels arranged in the two scanning channels differ, in pairs, with respect to the frequency range and the delay time.

Such a pair is, for example, constituted by channel 14 and 10.

The signal channels in cooperation with a discriminator 15 form a corrrelator unit.

The connection between the signal channels 7 to 14 and the discriminator 15 is established by correspondingly coordinated gates 16; 17; 18; 19; and 20; 21; 22; 23. The output of the discriminator 15 is electrically connected via a line 29 to a servo-motor 24 which, by means of mechanical displacement units 27, 28 (only indicated) accomplishes an adjustment of the stereo-couple of photographs 5, 6 in an image plane (not shown) along the x-direction.

As already referred to hereinabove, the signal channels are mutually coordinated in pairs, such as 7 and 11, 8 and 12, etc. and so are the gates 16 and 20, 17 and 21, 18 and 22 etc. which in turn are coordinated to the respective signal channels, such as signal channel pair 7, 11 to the gate pair 16, 20; 8, 12 to gate pair 17, 21 etc.

A clock-pulse generator 25 feeds the respective pulses into a pulse switch 26, which feeds the clock-pulses via respective clock-pulse inputs into the paired gates. The operation of the inventional arrangement is as follows. Rasters (not shown) are produced upon the screens of the cathode ray tubes 1, 2.

Optical systems (not represented for the sake of more simplicity) image said rasters upon the photographs 5, 6, which, in turn, modulate the light beams involved as to their brightness. The modulated light beams are imaged by optical means (not shown) upon the photocells 3, 4, which produce electric signals corresponding to the density graduation of the photographs 5, 6.

The photocell output signals are fed into the signal channels 7, 8, 9, 10, and 11, 12, 13, 14, respectively. One of the paired gates 16, 20; 17, 21; 18, 22; 19, 23; is in the ON-state so that the output signals from the paired signal channels 7, 11; 8, 12; 9, 13; 10, 14 are passed on to the discriminator 15.

The precision of the correlation depends on the resolution capability; the higher the resolution of the signal channels which are operative in the correlation the more precise is the correlation.

The resolution of the signal channels as represented in the drawing increases with the increasing referential numbers of the scanning channels.

Hence the channels 10 and 14 are employed to obtain the highest degree of precision.

The pulse switch 26 feeds control pulses into the gates 19 and 23 to open the latter. At this moment of operation the other gates 16, 17, 18 and 20, 21, 22 are in the Off-state so that interfering signals from the signal channels 7, 8, 9 and 11, 12, 13 are not involved in the correlation operation.

After definite clock-pulse periods the clock-pulse generator 25 triggers the pulse switch 26 to feed, similar to a shift register, pulses successively into the gates. The shift operation starts at the gates 16 and 20, respectively, and carries on via the intermediate gates to the gates 19 and 23, respectively.

In this manner the respective gates are switched into the ON-state one after another.

When, for example, the correlation is lost due to the narrow bandwidth of the highest resolving signal channels 10 and 14, which might occur when a terrain to be photographed abruptly rises or falls, the shift register operation of the gates ensures that the signals from the signal channels 7, 8, 9 and 11, 12, 13 are used in sequence to correlate the photographs until the correlator is balanced to maximum precision, that is, the high resolving channels 10, 14 are operatively connected via the open gates 19, 23 to the discriminator 15.

The time required to perform the balance operation depends on the clock-pulse frequency of the clock-pulse generator 25. According to the precision of the correlation obtained, the discriminator applies a signal corresponding to the correction necessary to the servo-motor 24 which, in turn, displaces the photographs 5 and 6 in x-direction via drive spindles 27 and 28, respectively. The displacement means further include apart from the servo-motor 24 and the drive spindles 27, 28 a d.c. amplifier (not shown).

The amount of the mutual displacements the stereo-couple of photographs 5, 6 is subject to is a measure of the height coordinate.

We claim:
1. A device for photogrammetric evaluation of stereo-couples of serial photographs, comprising
 a stereo-couple of two photographs,
 displacement means for displacing at least one of said two photographs,
 a first and a second cathode ray tube,
 a first and a second photo-detector
  said first cathode ray tube emitting a first light beam, said first photodetecting being for detecting said first light beam,
  one of said photographs being arranged in said first light beam,
  said second cathode ray tube being for emitting and said second photodetector being for detecting a second light beam,
  the other of said photographs being arrranged in said second light beam,
 a first group of four correlator signal channels,
 a second group of four correlator signal channels,
  said first group being electrically connected to the output of said first photodetector,
  said second group being connected to the output of said second photodetector,
  the individual correlator signal channels in said first and said second group having different frequency ranges and different delay times,
  the individual signal channels from said first group and the individual channels from said second group are connected in pairs,
  said pairs having identical frequency ranges and delay times,
 eight gate circuits,
  said gate circuits having first inputs,
  second inputs and an output each,
   said first inputs being connected to said individual signal channels,
   said second inputs connecting those gate circuits being in turn connected via said first inputs to said pairs of signal channels, thus forming pairs of gate circuits,
 a pulse switch having one input and four outputs,
 a clock-pulse generator being connected to said one input,
  said four outputs being respectively connected to said four pairs of gate circuits,
 a discriminator having two inputs and one output,
  the two discriminator inputs being connected via said four pairs of gate circuits and via said first group and said second group of signal channels to said first and second photodetector, respectively,
 a displacement means
  the discriminator output being connected to said displacement means,
   said displacement means being provided with means for displacing at least one of said two photographs.

* * * * *